(12) United States Patent
Hori et al.

(10) Patent No.: US 6,222,711 B1
(45) Date of Patent: Apr. 24, 2001

(54) BUS-BAR PROTECTION RELAY EQUIPMENT

(75) Inventors: Masao Hori, Saitama-ken; Noriyosi Suga, Tokyo; Kuniyasu Imamura, Saitama-ken; Hirosi Nisida; Masato Okazaki, both of Tokyo, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/294,392

(22) Filed: Apr. 20, 1999

(30) Foreign Application Priority Data

Apr. 21, 1998 (JP) .................................. 10-126678
May 25, 1998 (JP) .................................. 10-142919

(51) Int. Cl.[7] ...................................... H02H 3/18
(52) U.S. Cl. .............................. 361/80; 361/87
(58) Field of Search ................... 361/79–80, 87, 361/62–63, 67

(56) References Cited

U.S. PATENT DOCUMENTS 3,599,044 * 8/1971 Takemura et al. ...................... 361/82
5,325,061 * 6/1994 Schweitzer, III .................... 324/522

FOREIGN PATENT DOCUMENTS 0 083 772   7/1983  (EP) .
0 249 215  12/1987  (EP) .
0 723 325   7/1996  (EP) .
4-190626    7/1992  (JP) .

* cited by examiner

Primary Examiner—Michael J. Sherry
(74) Attorney, Agent, or Firm—Foley & Lardner

(57) ABSTRACT

A bus-bar protection relay equipment includes a data-acquisition means, a check zone protection means, a fault bus-bar judging means, and a tripping bus-bar judging means. A data-acquisition means transforms analog current signal from the current transformer connected to the bus-bar with two or more dependency regions into digital data at every predetermined cycle. The check zone protection means computes amount Id (vector sum) of operation, and the amount Ir (scalar sum) of inhibition using the digital data transformed by this data-acquisition means. The check zone protection means transforms analog current from the current transformer of a line segment into digital data "n" multiplied with. The amount Id of operation and the amount Ir of inhibition are computed. An actuating signal is outputted when predetermined relationship is satisfied by using the amounts Id and Ir. The fault of the internal and the external to the area which included the computed value two or more dependency regions by a predetermined a percentage differential protection calculation is judged. A fault bus-bar judging means 13 performs a fault bus-bar judging by two or more above-mentioned dependency regions using the operating quantity which computed the operating quantity and computed it in the operating quantity and the check zone protection means which were computed.

21 Claims, 10 Drawing Sheets

R: RESISTANCE
X: IMPEDANCE

FIG.11

| OUTPUT OF JUDGE TO INTERNAL OR EXTERNAL FAULT | OUTPUT OF FAULT BUS-BAR JUDGING MEANS | OUTOUT OF TRIPPING BUS-BAR JUDGING MEANS |
|---|---|---|
| INTERNAL FAULT | A AREA | TRIP TO A BUS-BAR |
| INTERNAL FAULT | B AREA | TRIP TO B BUS-BAR |
| INTERNAL FAULT | A AND B AREA | TRIP TO A, B BUS-BAR |
| INTERNAL FAULT | NONE | NONE |
| EXTERNAL FAULT | A AREA | NONE |
| EXTERNAL FAULT | B AREA | NONE |
| EXTERNAL FAULT | A AND B AREA | NONE |
| EXTERNAL FAULT | NONE | NONE |

BUS-BAR PROTECTION RELAY EQUIPMENT

FIELD OF THE INVENTION

This invention relates to a bus-bar protection relay equipment for an electrical power system.

DESCRIPTION OF THE RELATED ART

The protective regions of the bus-bar in electrical power systems are protected by tripping the output based on a combination of outputs described below.

That is, one is an output from a check zone protection relay with a current transformer (hereinafter referred as CT) saturation countermeasure element which judges an internal and an external fault in the protective zone, and the other is an output from a discriminating zone protection relay by CT saturation measure, which is set in accordance with all protective regions, which judges the internal and an external faults in all protective regions.

To begin with, a protective region with a fault is judged in the protective zone based on the above outputs, then the tripping output is sent out to protective regions to separate the protective region with fault from the other protective regions without fault.

However, the above mentioned bus-bar protection equipment needs two or more sets of the bus-bar protection relays with CT saturation measurement equipment to protect the bus-bar having a plurality of protective regions.

In connection with it, the structure of the whole equipment becomes complicated, the reliability reduces while the cost increases.

SUMMARY OF THE INVENTION

It is an object of the present invention to provide a bus-bar protection relay equipment which simplifies the structure of the bus-bar protection relay equipment.

It is a further object of the present invention to provide a bus-bar protection relay equipment with improved reliability.

It is still a further object of the present invention to provide a simpler and more cost effective bus-bar protection relay equipment.

According to one embodiment of this present invention, a bus-bar protection relay equipment for judging a protective region having a fault, among a protective zone that includes a plurality of protective regions, based on status of a power system, comprises: a first judging unit configured to judge whether an internal fault or an external fault exists in the protective zone by performing a percentage differential protection calculation based on an operating quantity Id and a restrained quantity Ir of the protective zone; a first calculating unit configured to calculate an operating quantity Idi of each protective region, where i is equal to an integer from 1 to n; a second judging unit configured to judge a protective region having the internal fault when an absolute value of a Idi is larger than a coefficient multiplied by an absolute value of a Id; and an output unit configured to output a signal to separate non-fault protective regions from a protective region with the fault based on the result of the first judging unit and the second judging unit.

A bus-bar protection relay equipment for judging a protective region having a fault, among a protective zone that includes a plurality of protective regions, based on status of a power system, comprises: a first judging unit configured to judge whether an internal fault or an external fault exists in the protective zone by performing a percentage differential protection calculation based on an operating quantity Id and a restrained quantity Ir of the protective zone; a first calculating unit configured to calculate an operating quantity Idi of each protective region, where i is equal to an integer from 1 to n; a second judging unit configured to judge a protective region having the internal fault when a difference between an absolute value of the Idi and an absolute value of the Id is smaller than a coefficient multiplied by an absolute value of the Id; and an output unit configured to output a signal to separate non-fault protective regions from a protective region with the fault based on the result of the first judging unit and the second judging unit. Furthermore, the bus-bar protection relay equipment comprises: wherein the second judging unit configured to judge the protective region having the internal fault when following equations are satisfied: (1) an absolute value of the Idi is more than the coefficient multiplied with an absolute value of the Id, (2) a phase difference between a phase of the Idi and a phase of the Id is more than a designated phase of the Idi to satisfy the equation (1); and an output unit configured to output a signal to separate non-fault protective regions from a protective region with the fault based on the result of the first judging unit and the second judging unit. Furthermore, the bus-bar protection relay equipment comprises: wherein the second judging unit configured to judge a protective region having the internal fault when following equations are satisfied: (1) an absolute value of the Idi is a coefficient (less than 1) multiplied with an absolute value of the Id; (2) an absolute value of the Idi is a coefficient (more than 1) multiplied with an absolute value of the Id; (3) a phase difference between a phase of the Idi and a phase of the Id is more than designated phase of the Idi to satisfy the equations (11) and (2); and an output unit configured to output a signal to separate non-fault protective regions from a protective region with the fault based on the result of the first judging unit and the second judging unit. Furthermore, the bus-bar protection relay equipment comprises: wherein the second judging unit configured to judge a protective region having the internal fault when following equations are satisfied: an absolute value of the Idi is more than a coefficient (less than 1) multiplied with an absolute value of max {the Id, prescribed value}; and an output unit configured to output a signal to separate non-fault protective regions from a protective region with the fault based on the result of the first judging unit and the second judging unit. Furthermore, the bus-bar protection relay equipment comprises: wherein the second judging unit configured to judge a protective region having the internal fault when following equations are satisfied: (1) an absolute value of the Idi is more than a coefficient (less than 1) multiplied with an absolute value of max {the Id, a prescribed value}; (2) a phase difference between a phase of the Idi and a phase of Id is less than a designated phase of the Idi to satisfy the equation (1); and an output unit configured to output a signal to separate non-fault protective regions from a protective region with the fault based on the result of the first judging unit and the second judging unit. Furthermore, the bus-bar protection relay equipment comprises: wherein the second judging unit configured to judge a protective region having the internal fault when following equations are satisfied: (1) an absolute value of the Idi is more than a coefficient (less than 1) multiplied with an absolute value of max{the Id, a prescribed value}; (2) an absolute value of the Idi is less than a coefficient multiplied (more than 1) an absolute value of the Id; an output unit configured to output a signal to separate non-fault protective regions from a protective region with the fault based on the result of the first judging unit and the second judging unit. Furthermore, the bus-bar protection relay equipment comprises: wherein the second judging unit configured to judge a protective region having the internal fault when following equations are satisfied: (1) an absolute value of the Idi is more than a value which a coefficient (less than 1) multiplied with a sum of an absolute value of the Id and a prescribed value; (2) an absolute value of the Idi is less than a value which a coefficient (more than 1) multiplied with the sum of an absolute value of the Id and a prescribed value; (3) a phase difference between a phase of the Idi and phase of the Id is more than a designated phase among the Idi to satisfy the equations (1) and (2); and an output unit configured to output a signal to separate non-fault protective regions from a protective region with the fault based on the result of the first judging unit and the second judging unit. Furthermore, the bus-bar protection relay equipment comprises: wherein the second judging unit configured to judge a protective region having the internal fault when a difference between an absolute value of the Idi and an absolute value of the Id is less than a coefficient multiplied with an absolute value of the Id and that an absolute value of the Idi is more than a coefficient (less than 1) multiplied with a prescribed value; and an output unit configured to output a signal to separate non-fault protective regions from a protective region with the fault based on the result of the first judging unit and the second judging unit. Furthermore, the bus-bar protection relay equipment comprises: wherein the second judging unit configured to judge a protective region having the internal fault when following equations are satisfied: (1) an absolute value of the Idi is more than a coefficient (less than 1) multiplied with a prescribed value; (2) an absolute value difference between the Idi and the Id is less than a coefficient multiplied with an absolute value of the Id; and an output unit configured to output a signal to separate non-fault protective regions from a protective region with the fault based on the result of the first judging unit and the second judging unit.

According to another embodiment of this invention, a bus-bar protection relay equipment for judging a protective region having a fault, among a protective zone that includes two protective regions, based on status of power system, comprising: a first judging unit configured to judge whether an internal fault or an external fault exists in the protective zone by performing a percentage differential protection calculation based on operating quantity and a restrained quantity of the protective zone; a first calculating unit configured to calculate each operating quantity the Idi of two protective regions; a second judging unit configured to judge a protective region having an internal fault when an absolute value of one protective region is larger than a coefficient multiplied with an absolute value of Id and that an absolute value of the other protective region is smaller than a coefficient multiplied with an absolute value of the Id; and an output unit configured to output a signal to separate non-fault protective regions from a protective region with the fault based on the result of the first judging unit and the second judging unit.

According to another embodiment of this invention, a bus-bar protection relay equipment for judging a protective region having a fault, among a protective zone that includes a plurality of protective regions, based on status of a power system, comprises: a first judging unit configured to judge whether an internal fault or an external fault exists in the protective zone by performing a percentage differential protection calculation based on an operating quantity Id and a restrained quantity Ir of the protective zone; a first calculating unit configured to calculate each operating quantity Idi, where i is equal to an integer from 1 to 2 for two protective regions; a second calculating unit configured to calculate each amount of change ($\Delta$Idi, $\Delta$Id) of the Idi and the Id, respectively, in a predetermined time; and a second judging unit configured to judge a protective region having an internal fault when following equations are satisfied: (1) an absolute value of the $\Delta$Idi is more than a coefficient multiplied with an absolute value of the $\Delta$Id; (2) an absolute value of max {an absolute value of the $\Delta$Idi} is more than a coefficient multiplied with an absolute value of the $\Delta$Id.

According to another embodiment of this invention, a bus-bar protection relay equipment for judging a protective region having a fault, among a protective zone that includes two protective regions, based on status of a power system, comprising: a first judging unit configured to judge whether an internal fault or an external fault exists in the protective zone by performing a percentage differential protection calculation based on an operating quantity Id and a restrained quantity Ir of the protective zone; a first calculating unit configured to calculate each operating quantity Idi, where i is an integer from 1 to 2 of two protective regions; a second calculating unit configured to calculate each amount of change $\Delta$Idi, $\Delta$Id for the Idi and the Id, respectively, in a predetermined time; and a second judging unit configured to judge a protective region having an internal fault when an absolute value of the $\Delta$Idi is more than a coefficient multiplied with an absolute value of the $\Delta$Id.

According to another embodiment of this invention, a bus-bar protection relay equipment for judging a protective region having a fault, among a protective zone that includes a plurality of protective regions, based on status of a power system, comprises: a first judging unit configured to judge whether an internal fault or an external fault exists in the protective zone by performing a percentage differential protection calculation based on an operating quantity Id and a restrained quantity Ir of the protective zone; a first calculating unit configured to calculate a positive operating quantity Id+ and a negative operating quantity Id− based on an operating quantity Id of a protective zone; a second calculating unit configured to calculate a positive operating quantity Idi+ and a negative operating quantity Idi− based on an operating quantity Idi of each protective region, where i is equal an integer from 1 to n; a second judging unit configured to judge a protective region having an internal fault when following equations are satisfied: (1) an absolute value of the Idi+ is more than a coefficient multiplied with an absolute value of the Id+; (2) an absolute value of the Idi− is more than a coefficient multiplied with an absolute value of the Id−; and a sending unit for sending tripping output based on both result of the first judging unit and the second judging unit.

According to another embodiment of this invention, a bus-bar protection relay equipment for judging a protective region having a fault, among a protective zone that includes a plurality of protective regions, based on status of a power system, comprises: a first judging unit configured to judge whether an internal fault or an external fault exists in the protective zone by performing a percentage differential protection calculation based on an operating quantity Id and a restrained quantity Ir of the protective zone; a first unit configured to calculate amount of change $\Delta$Idi of the Idi in a predetermined time; a second unit configured to calculate amount of change $\Delta$Id of Id in the predetermined time; a third unit configured to judge a protective region with fault when an absolute value of the $\Delta$Idi is more than a coefficient multiplied with an absolute value of the ΔId. Furthermore, the bus-bar protection relay equipment comprises wherein the third unit configured to judge a protective region with a fault when followings equations are satisfied: (1) an absolute value of the ΔIdi is more than a coefficient multiplied with an absolute value of the ΔId; and (2) an absolute value of max {the ΔIdi} is more than the coefficient multiplied with the absolute value of the ΔId.

According to another embodiment of this invention, a bus-bar protection relay equipment for judging a protective region having a fault, among a protective zone that includes a plurality of protective regions, based on status of a power system, comprises: a first judging unit configured to judge whether an internal fault or an external fault exists in the protective zone by performing a percentage differential protection calculation based on an operating quantity Id and a restrained quantity Ir of the protective zone; a first calculating unit configured to calculate an operating quantity Idi of each protective region, where i is equal to an integer from 1 to n; a second judging unit configured to judge a protective region having an internal fault, based on equation between amount of change of the Idi and amount of change of the Id in a predetermined time; a fault detecting unit configured to detect a fault in the power system; and a third judging unit configured to send a tripping output in the protective region when a fault determined by the second judging unit, the fault detecting unit and the first judging unit. Furthermore, the bus-bar protection relay equipment comprises wherein the first judging unit comprising: a first unit configured to calculate amount of the ΔIdi of the Idi in a predetermined time; a second unit configured to calculate amount of the ΔId of the Id in the predetermined time; a third unit configured judge a protective region with a fault when an absolute value of the ΔIdi is more than a coefficient multiplied with an absolute value of the ΔId. Furthermore the bus-bar protection relay equipment comprises wherein the first judging unit comprising: a first unit configured to calculate amount of a ΔIdi of the Idi in a predetermined time; a second unit configured to calculate amount of a ΔId of the Id in a predetermined time; and a third unit configured to judge a protective region with a fault when following equations are satisfied: (1) a phase difference between a phase of the Idi and a phase of the Id is more than a designated phase; and (2) an absolute value of the ΔIdi is more than a predetermined value. Furthermore, the bus-bar protection relay equipment comprises wherein the first judging unit comprising: a first unit configured to calculate amount of the ΔIdi of the Idi in a predetermined time; a second unit configured to calculate amount of the ΔId of the Id in a predetermined time; a third unit configured to judge a protective region with fault when following equations are satisfied: (1) a phase difference between a phase of the Idi and a phase of the Id is more than a designated phase; and (2) an absolute value of the ΔIdi is more than an absolute value of the ΔId, and furthermore, comprises wherein the second judging unit comprising: a first unit configured to judge a protective region having a fault, among a protective zone that includes a plurality of protective regions, based on a status of power system, comprising: a first judging unit configured to judge whether an internal fault or an external fault exists in a protective zone by performing a percentage differential protection calculation based on an operating quantity Id and a restrained quantity Ir of the protective zone; a first calculating unit configured to calculate a positive operating quantity Id+ and a negative operating quantity Id− based on an operating quantity Id of a protective zone; a second calculating unit configured to calculate a positive operating quantity Idi+ and a negative operating quantity Idi− based on an operating quantity Idi of each a protective region, where i is equal an integer from 1 to n; and a second judging unit configured to judge a protective region having an internal fault when following equations are satisfied: (1) an absolute value of the Idi+ is more than a coefficient multiplied with an absolute value of the Id+; (2) an absolute value of the Idi− is more than a coefficient multiplied with an absolute value of Id−; and (3) an absolute value both of the Idi+ and the Idi− is more than a predetermined value.

BRIEF DESCRIPTION OF THE DRAWINGS

A more complete appreciation of the invention and many of the attendant advantages thereof will be readily obtained and better understood by reference to the following detailed description when considered in connection with the accompanying drawings.

FIG. 11 shows the format of data arrangement of the judgment table for tripping bus-bars.

DETAILED DESCRIPTION OF THE PREFERRED EMBODIMENTS

Figure 1:
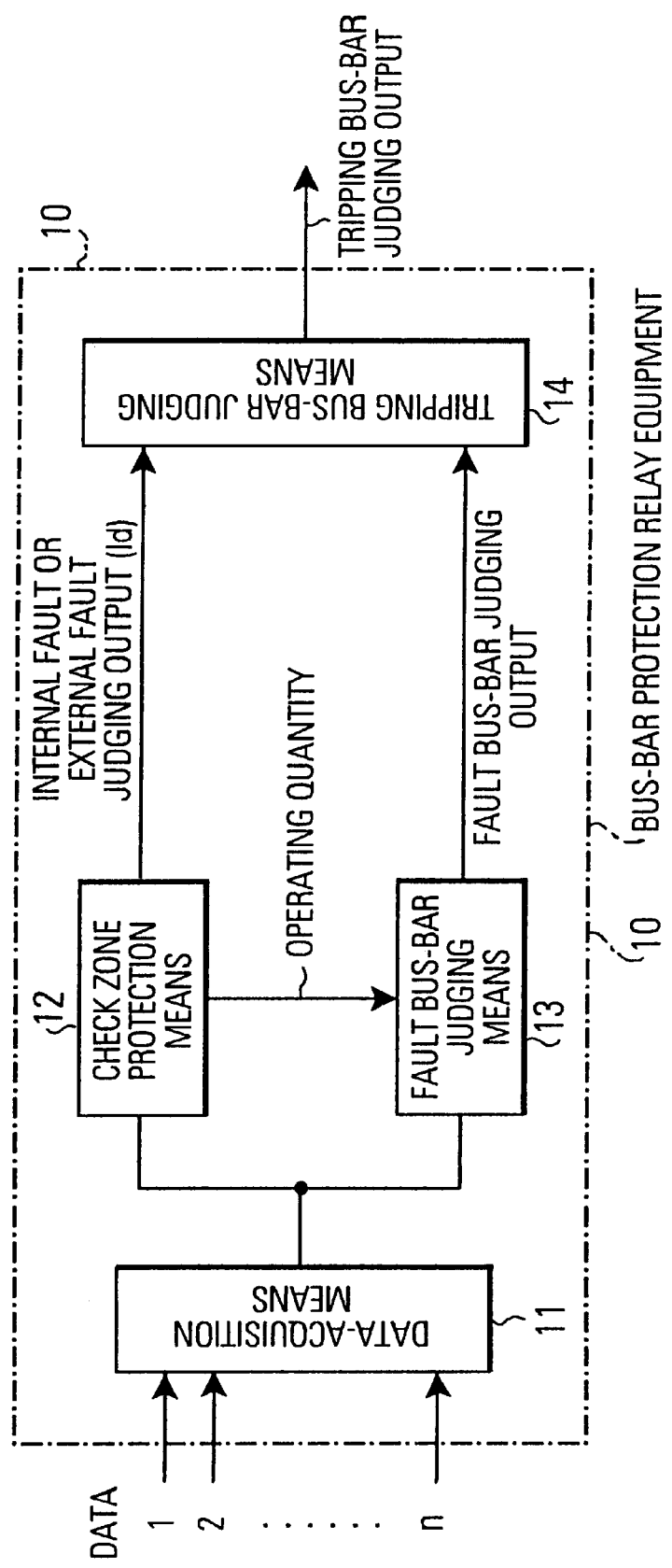
FIG. 1 is a functional block diagram of 1st, 2nd, 3rd and 4th embodiments of a bus-bar protection relay equipment in connection with this invention.

FIG. 1 is the functional-block diagram related to the 1st, 2nd, 4th and 5th embodiments of a bus-bar protection relay equipment in connection with this invention. In FIG. 1, bus-bar protection relay equipment 10 of an electrical power system includes a data-acquisition means 11, a check zone protection means 12, a fault bus-bar judging means 13, and a tripping bus-bar judging means 14.

Hereinafter, the function of each device is explained.

Also, hereinafter, the terms protective region and dependency region have the same meaning.

The data-acquisition means 11 transforms an analog current signal from a current transformer connected to the bus-bar with two or more dependency regions, into digital data for every predetermined cycle.

The check zone protection means 12 computes an amount Id (vector sum) of operation, and an amount Ir (scalar sum) of inhibition using the digital data transformed by the data-acquisition means 11.

The check zone protection means 12 transforms analog current from the current transformer corresponding to each line segment into digital data. The amount Id of operation and the amount Ir of inhibition are computed using the operation expression which carries out the following functions using the digital data.

$$Id = i1 + i2 + \cdots + in: \tag{1}$$

$$Ir = |i1| + |i2| + \cdots + |in|: \tag{2}$$

$$|Id| - K0*|Ir| \geq 0: \tag{3}$$

Where K0 is a coefficient set in accordance with functions of the protection.

An actuating signal is outputted when the above equations are not by using the amounts Id and Ir as calculated.

The internal and external faults in the area which includes the computed value for two or more dependency regions by a predetermined percentage differential protection calculation is judged.

The fault bus-bar judging means 13 performs a fault bus-bar judging operation for two or more above-mentioned dependency regions using the operating quantity which was computed with the operating quantity and the check zone protection means 12, and outputs a fault bus-bar judging output.

A tripping bus-bar judging means 14 obtains a tripping bus-bar judging output based on the output of a check zone protection means 12 or an external judging output, and the fault bus-bar judging output from the fault bus-bar judging means 13.

To perform fault bus-bar judging in the fault bus-bar judging means 13, in order to discriminate an individual area to two or more above-mentioned dependency regions, the isolator conditions (LSA, LSB) of each line are incorporated.

Discernment of the dependency region by isolator conditions is based on a well-known method. For example, if only LSA has closed conditions when one line is connected with two bus-bars BA and BB by LSA and LSB (FIG. 2), current which flows in the concerned line will be introduced into the operation of area A.

Moreover, if only LSB has closed conditions, the current will be introduced into area B. Incidentally, if both (LSA, LSB) have closed conditions, the current of all lines is used in the calculation of area A and area B. Similarly, if both (LSA,LSB) have opened conditions, the current of all lines is used in the calculation of area A and area B.

Figure 2:
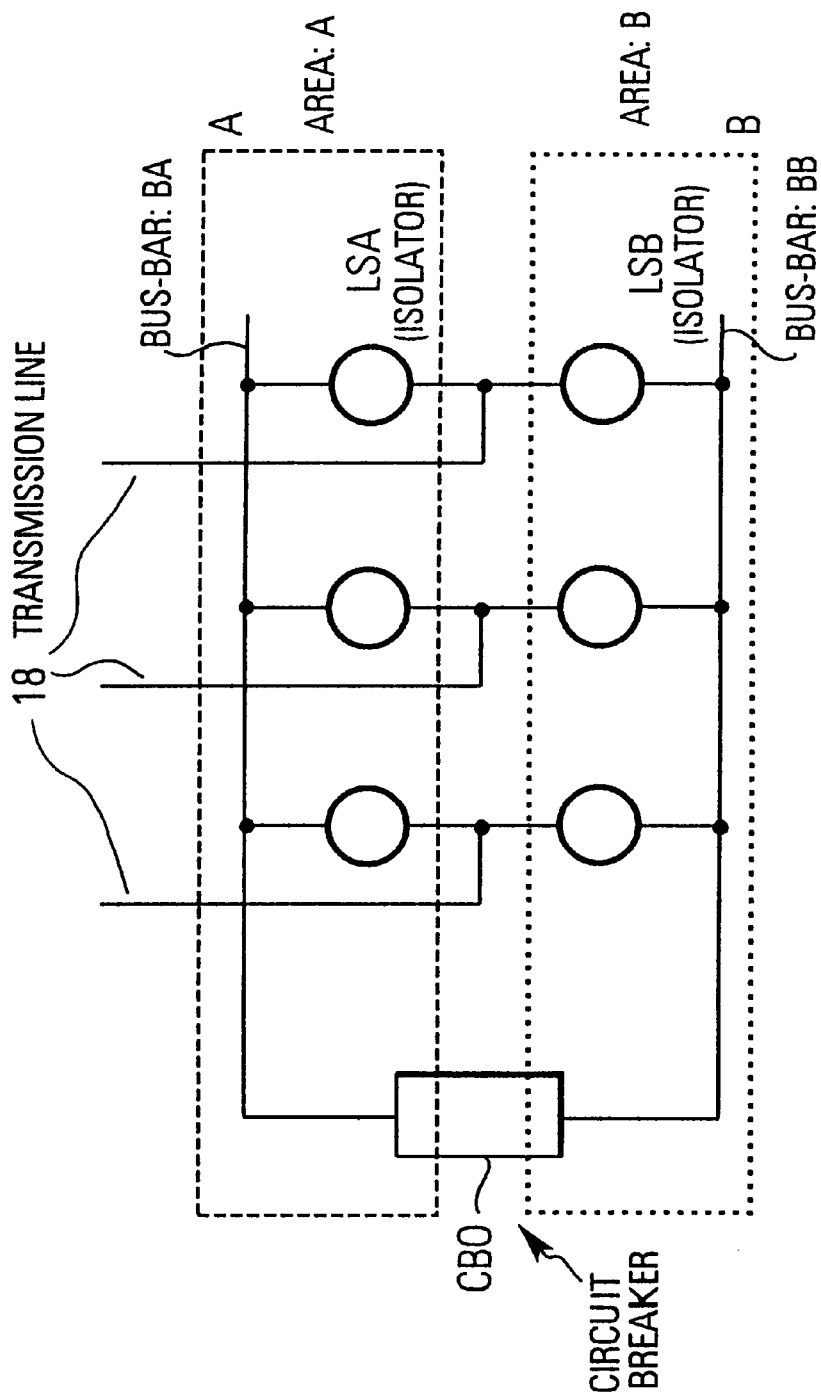
FIG. 2 is a system diagram of a bus-bar having with two or more dependency regions.

FIG. 2 is an example of a system diagram of the bus-bar with two or more dependency regions. The bus-bar dependency region of this transmission line 18 is composed of area A on the side of a bus-bar BA, and the area B on the side of a bus-bar BB. These bus-bars BA and the bus-bar BB are divided through the circuit-breaker CB0.

The bus-bar BA connected to this transmission line 18 and the bus-bar BB are changed by isolators LSA and LSB.

When the fault occurs in the internal to a bus-bar shown in FIG. 2, for example, in area A, the amount Id of operation generated in the area which includes two areas turns into the amount (differential current) IdA of operation generated in two dependency regions internal to a bus-bar in the dependency region which the fault generated, and the same quantity.

Therefore, a fault bus-bar judging means 13 compares each of the two amounts IdA or IdB of operation computed for every dependency region by each to the amount Id of operation computed with the check zone protection means 12.

For example, for region A the following calculation is performed.

$$|IdA| \geq K1*|Id| \tag{4}$$

When the above equation is met, it judges that the fault happened in area A. In addition, K1 of the above-mentioned equation (4) is a coefficient which is less than or equal to one.

Figure 3:
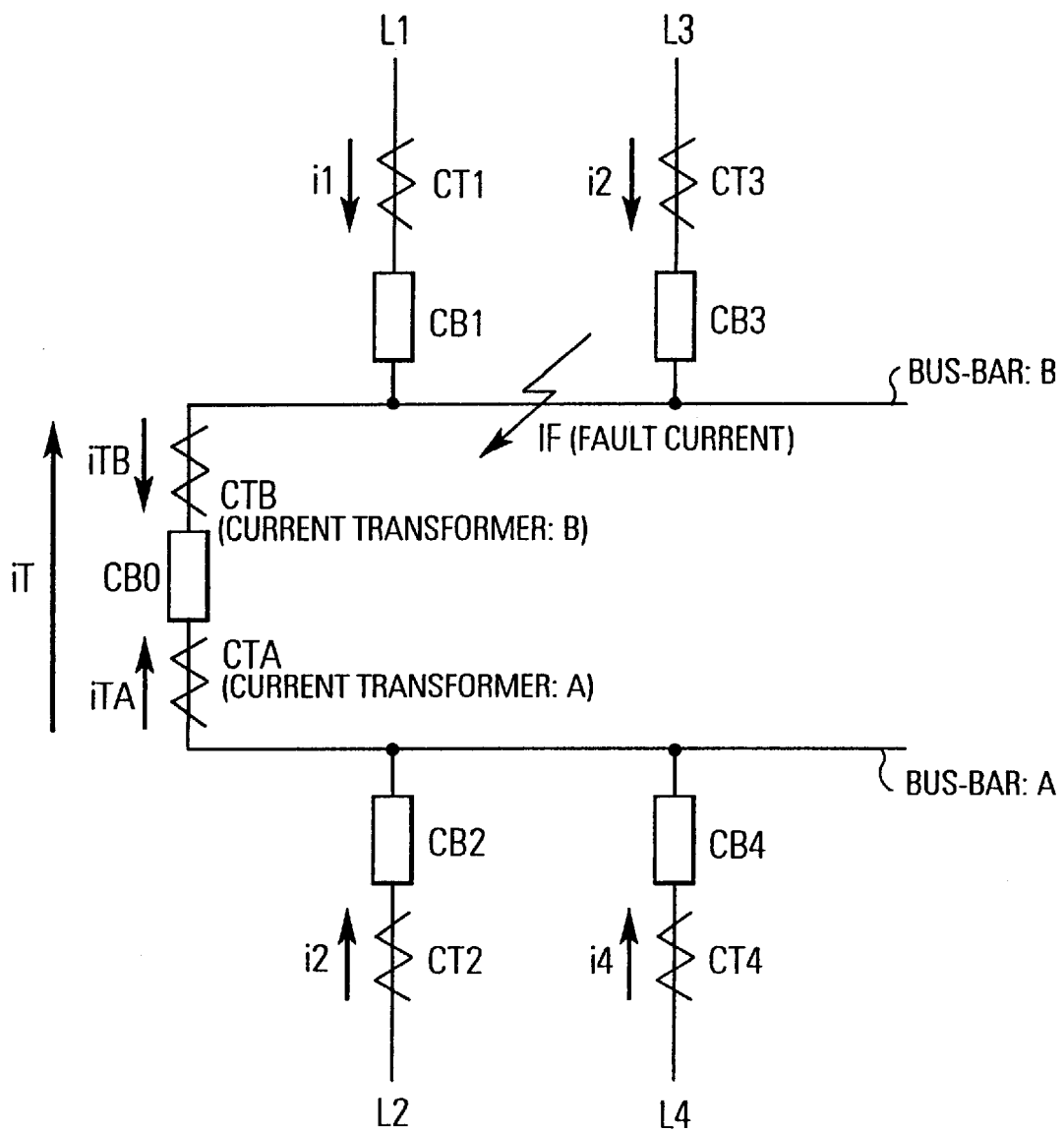
FIG. 3 is a protection system diagram for explaining the form of the embodiment of this invention.

FIG. 3 shows the fault current which flows to the bus-bar for two dependency regions about the feature of the amount (differential current) of operation generated at the time of the fault being explained by an example.

In FIG. 3, the bus-bar is divided into the bus-bar BA and the bus-bar BB on both sides of the circuit-breaker CB0, and transmission lines L2 and L4 are connected to transmission lines L1 and L3 and the bus-bar BB at the bus-bar BA.

It is installed in transmission lines L1, L2, L3, and L4 by the circuit-breakers CB1, CB2, CB3, and CB4 and the current transformers CT1, CT2, CT3, and CT4, and current transformers CTA and CTB are installed in both ends of the circuit-breaker CB0.

Differential current Id in the check zone protection means 12 and differential current IdA ,IdB in the fault bus-bar judging means 13 satisfy the following equations, if current which flows to each CT is set to i1, i2, i3, i4, iTA, and iTB.

$$Id = i1 + i2 + i3 + i4 \tag{5}$$

$$IdA = i1 + i3 + iTA \tag{6}$$

$$IdB = i2 + i4 + iTB \tag{7}$$

If the fault happens internal to the bus-bar BA, current from transmission lines L2 and L4 will flows into the bus-bar BA through the circuit-breaker CB0.

When current which passes fault current at this time IF and the circuit-breaker CB0 is set to IT, between each current, it is determined by equations (8) provided below using Kirchhoff's law, and equations (9). Equations (10), (11) and (12) are obtained, based on equations (5), (6) and (7).

$$IT = iTA = -iTB = i2 + i4 \tag{8}$$

$$IF = i1 + i3 + iTA \tag{9}$$

$$ID = IF \tag{10}$$

$$Id = IF \tag{11}$$

$$IdB = 0 \tag{12}$$

As shown above, when the fault happens internal to a bus-bar, differential current generated in the area which includes two areas becomes the same quantity as differential current generated in two dependency regions internal to the bus-bar in the dependency region where the fault was generated.

Therefore, the Id computed in the check zone protection means 12 is compared with (IdA or IdB) computed individually in a fault bus-bar judging means 13, in accordance with the dependency region.

The judgment of a fault bus-bar is attained by confirming that a predetermined equation is satisfied among both regions.

Next, the operation principle of a fault bus-bar judging means 13 is explained using the following characteristics.

FIGS 4–7 show the property principle vector characteristics explaining the equation between the Id computed in a check zone protection means 12 and the operating amount (IdA at the side of a fault bus-bar) computed individually in accordance with each protective area, in the fault bus-bar judging means 13.

In each figure, the vertical axis show the impedance (x), and the horizontal axis show the resistance.

Figure 4:
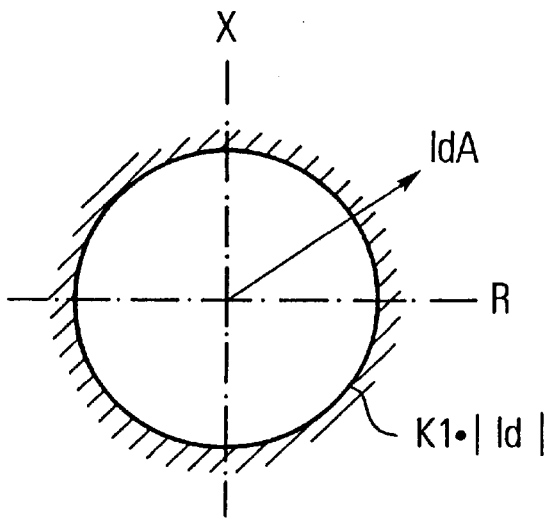
FIG. 4 shows a 1st embodiment of the bus-bar protection relay equipment in connection with this invention.

FIG. 4 shows the characteristics of the 1st embodiment, compares the absolute value of Id with the absolute value of IdA, and shows the system which distinguishes a fault generating area.

When the fault happens in area A, IdA and Id have as the same quantity theoretically. On the other hand, the absolute value of Id, since IdA takes the value near Id even if it takes a part for an error, should be considered.

In addition, in FIGS. 4–7, the meaning of area A means "the area A in the bus-bar shown in FIG. 2", or the "dependency region which obtains amount IdA of operation."

The fault in the area A is judged if equation (13) is satisfied between the absolute value of IdA, and the absolute values of Id by using above-mentioned principle.

Moreover, the fault in the area B is judged if equation (14) is satisfied between the absolute value of IdB, and the absolute values of Id by using the above-mentioned principle.

$$|IdA| \geq K1^*|Id| \tag{13}$$

$$|IdB| \geq K1^*|Id| \tag{14}$$

(The predetermined coefficient in K1 is equal to one or less.)

Figure 5:
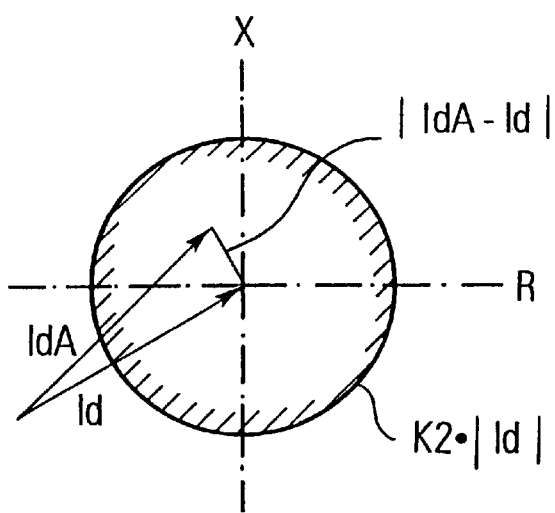
FIG. 5 shows a 2nd embodiment of the bus-bar protection relay equipment in connection with this invention.

FIG. 5 shows characteristics of a 2nd embodiment.

After computing, the absolute value |IdA−Id| for a difference of IdA and Id, comparison with the absolute value of Id is performed, and the system which distinguishes a fault generating area is shown.

When the fault happens in area A, IdA and Id serve as the same value as in the vector.

Therefore, the amount of difference between IdA and Id is equivalent to an error vector, and a big value cannot occur at the time of the fault in area A.

When the equation of (15) is satisfied in the value of the absolute value for a difference of IdA and Id, and the absolute value of Id, it distinguishes that the fault happened in the area which computed the amount IdA of operation from this.

$$|IdA - Id| \geq K2^*|Id| \tag{15}$$

(K2 is a coefficient less than or equal to 1.)

Figure 6:
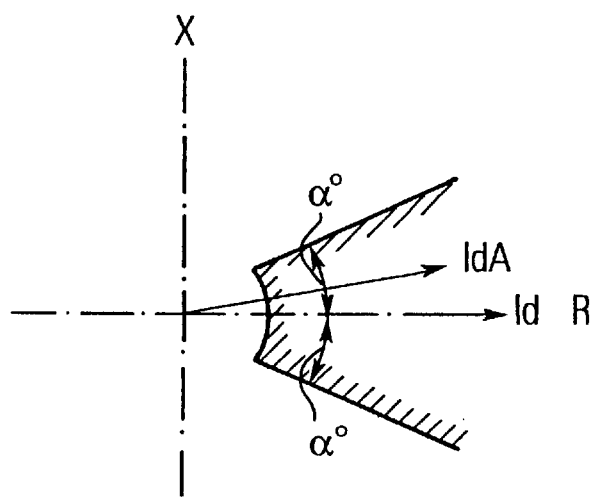
FIG. 6 shows a 3rd embodiment of bus-bar protection relay equipment in connection with this invention.

FIG. 6 shows characteristics of the 3rd embodiment with added phase comparison of Id and IdA to FIG. 4.

The scalar amount for IdA and Id serving as the same quantity in vector when the fault happens in area A, a phase(θ) is also the same for each other.

When the equation of (16) is satisfied in addition to formation of equation (13), it distinguishes that the fault happened in the area A which computed the amount IdA of operation from this.

$$|Id \wedge IdA| \leq \alpha \tag{16}$$

(α is a predetermined phase angle, which is based on margin related to error "quantity of power system by inputted, calculation")

Figure 7:
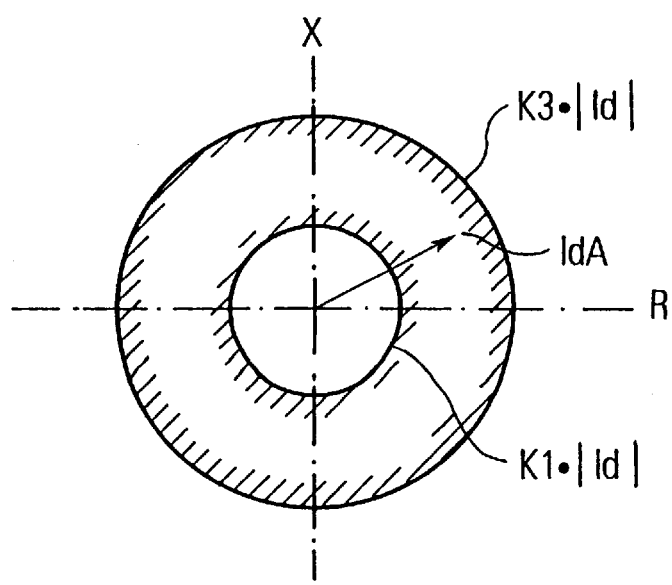
FIG. 7 shows a 4th embodiment of bus-bar protection relay equipment in connection with this invention.

FIG. 7 shows the conditions which give a maximum, further to the absolute value of IdA, to equation (13) showing the characteristics of the 4th embodiment and showing the equation between the absolute value of Id, and the absolute value of IdA.

When the fault happens in area A, the values of IdA and Id become the same, so, the absolute value of IdA does not greatly exceed the absolute value of Id greatly.

When the equation of (17) is satisfied between the absolute value of IdA, and the absolute value of Id and equation (16) is further satisfied, it distinguishes that the fault happened in the area A which computed the amount IdA of operation from this.

$$K1^*|Id| \leq |IdA| \leq K3^*|Id| \tag{17}$$

(K1 is a coefficient less than or equal to 1, and K3 is a coefficient greater than or equal to 1.)

In order that the absolute value of the operating quantity at the time of the fault generation may perform an internal and an external fault judging in an operation means for protection at least, it should become larger than the sensitivity value (KTAP) set up beforehand.

Here, KTAP is defined as a value to detect a minimum fault current.

Therefore, it can be said that the absolute value of IdA when the fault happens in area A also becomes larger than this sensitivity value.

From this, a transitional incorrect operation in the fault initial stage with the small operating quantity can be prevented at the time by using as equation (18) in consideration of this sensitivity value (KTAP) as minimum value of the operating quantity in the equation expression (13) between the absolute values of IdA and Id.

Moreover, the conditions of equation (18) are set up as AND conditions with equation (16), the fault bus-bar judging is possible, and also a fault bus-bar judging can also be performed as equation (19) combining with equations (17).

$$K1^*|IdA| \geq \max\{|Id|, KTAP\} \tag{18}$$

In addition, max {A, B} means that a larger value is shown between {}.

$$K1-(\max\{|Id|, KTAP\} \leq |IdA| \leq K3^*|Id| \tag{19}$$

(K1 is a coefficient less than or equal to 1, and K3 is a coefficient greater than or equal to 1.)

Similarly, by using a sensitivity value in order to set up the minimum value of the operating quantity, equation (20) is also effective.

For incorrect detection prevention in a small current area, a sensitivity value (KTAP) multiplied by the predetermined coefficient (K4) as a minimum value of the amount IdA of operation is set up, using equation (21).

By setting up as an AND with equation (15), the fault bus-bar judging of this equation (15) is attained.

Moreover, in the above-mentioned judgment equation, a more reliable fault bus-bar judging can be performed by setting up equation (15) and equations (16) as "AND" conditions.

$$|IdA| \geq K7^*(|Id|+KTAP) \tag{20}$$

$$|IdA| \geq K4^*KTAP \tag{21}$$

(K4 is a coefficient less than or equal to 1.)

Next, a case where a dependency region is limited to two is considered.

Although the amount IdA of operation of area A turns into the amount Id of operation of an operation means for protection, and the same quantity as mentioned above when the fault happens in the area A in two dependency regions A and B, the amount IdB of operation of the area B at this time is not generated (it becomes only a part for error).

The present invention takes into consideration that equation (22) is satisfied between the absolute value of IdB, and the absolute value of Id as conditions of detecting that the fault happened in area A.

When the fault is not generated in area A and area B, in order to determine that the fault has happened to both of the areas, on condition that the fault has happened to one of areas, equation (22) is used.

When the conditions of equation (13) using the absolute value of the amount IdA of operation of area A and the absolute value of Id as this condition are added and conditions are satisfied simultaneously with equation (22), it determines that the fault has happened in area A.

The conditions which the fault has generated in area B similarly are determined with formation of both the conditions of equations (23) and (24).

$$|IdB| \leq K5*|Id| \quad (22)$$

$$|IdA| \leq K5*|Id| \quad (23)$$

$$|IdB| \geq K1*|Id| \quad (24)$$

(K5 is one or less coefficient)

Tripping bus-bar judging means 14 judges the bus-bar which should be tripped, based on the internal and the external fault judging output from a check zone protection means 12, and the result of judgment of a fault bus-bar judging means 13.

For example, when a check zone protection means 12 performs an internal fault judging and a fault bus-bar judging means outputs the fault judging of area A, the tripping output to the line connected to the bus-bar of area A is started.

The judgment of a tripping bus-bar judging means 14 is performed according to FIG. 11, and, thereby, tripping starting of a fault generating area (fault bus-bar connection line) is performed.

Figure 8:
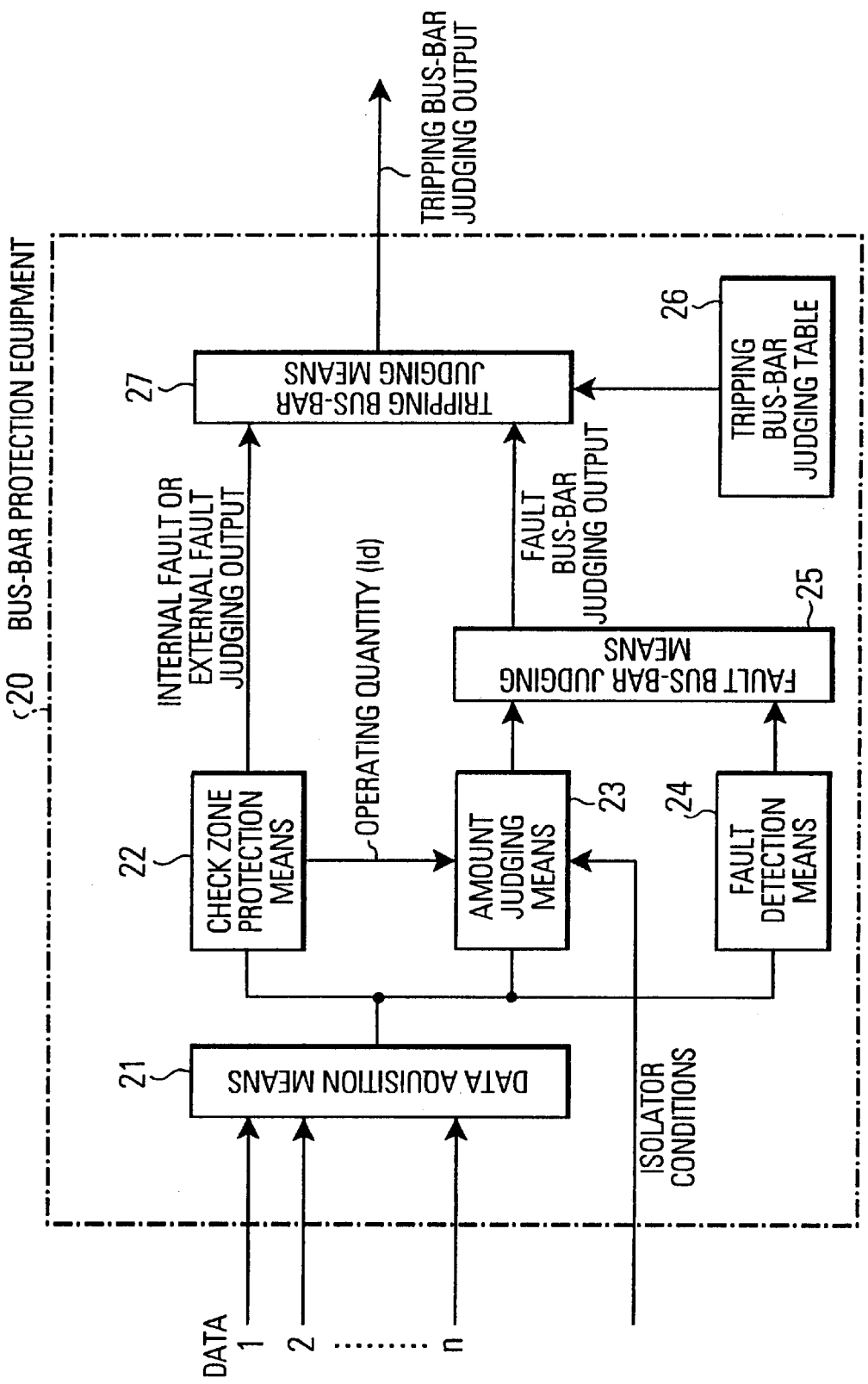
FIG. 8 is a functional block diagram of 5th, 6th, 7th, and 8th embodiments of bus-bar protection relay equipment in connection with this invention.

FIG. 8 is the functional block diagram related to the 5th, 6th, 7th, and 8th embodiments of the bus-bar protection relay equipment in connection with this invention.

First, the 5th embodiment will be explained according to the FIG. 8.

Bus-bar protection relay equipment 20 of electrical power system includes a data-acquisition means 21, a check zone protection means 22, the amount operation judging means 23, a fault detection means 24, a fault bus-bar judging means 25, a tripping bus-bar judging table 26, and a tripping bus-bar judging means 27.

To avoid repetition of what has been described for FIG. 1, the following description is limited to additional features of the embodiment.

The amount operation judging means 23 in operation computes the amount of change $\Delta Idi$ of operating quantity Idi (i:1–n) in a predetermined time from the digital data which corresponds for every individual dependency region.

The amount of change $\Delta Id$ in the predetermined time of operating quantity Id in the check zone protection means 22 is compared with this amount of change $\Delta Idi$ of individual dependency region, a fault generating area is judged the individual dependency region where the amount of change $\Delta Idi$ becomes large among the regions.

A fault detection means 24 detects faults generated from a changed part in the predetermined time of the digital data transformed by the above-mentioned data-acquisition means 21, or an analog current signal.

A fault bus-bar judging means 25 outputs the judgment result of the fault bus-bar which extended the judgment result of the above-mentioned amount judging means 23 of operation, and the detection output of the above-mentioned fault detection means 24 at a predetermined time.

That is, since the output needs to be extended until a fault bus-bar judging is completed normally, and since a continued output is not obtained, fault detection by the changed part sets up time to extend according to the situation.

A tripping bus-bar judging table 26 stores the judgment data for tripping bus-bars.

A tripping bus-bar judging means 27 judges a tripping bus-bar with reference to the judgment table for tripping bus-bars 26 based on the internal or external judging output of the check zone protection means 22, and the fault bus-bar judging output of the above-mentioned fault bus-bar judging means 25.

FIG. 2 is the system diagram of the bus-bar with two or more dependency regions.

This bus-bar dependency region of this transmission line 18 is separated into area A at the side of a bus-bar BA, and area B at the side of a bus-bar BB. These bus-bars BA and the bus-bar BB are divided through the circuit-breaker CB0.

The bus-bar BA connected to the transmission line 18 and the bus-bar BB serve as the structure which is changed by isolators LSA and LSB.

Next, the operation of the equipment mentioned above is explained.

First, a data-acquisition means 21 incorporates current from the current transformer for n lines connected to the bus-bar which has two or more dependency regions for every predetermined cycle, and transforms it into digital data for each line.

The sequential digital data is sent out to the check zone protection means 22.

The check zone protection means 22 transforms the analog current from the current transformer of a line segment into digital data for each of the n lines. Regarding the operation processing, more explanation is omitted since the operation of the operating quantity is similar to that of FIG. 1.

For example, the internal fault judging output of a bus-bar is sent out.

In addition, known CT saturation measurement techniques are taken into consideration for the check zone protection means 22. On the one hand, in the amount operation judging means 23, in order to discriminate a individual dependency region to two or more dependency regions, the isolator (LSA, LSB) conditions of each line are incorporated.

Since discernment of the dependency region by isolator conditions is by well-known techniques, any detailed explanation is omitted here.

The amount (operation current) of operation generated with reference to FIG. 2 at the time of the fault is explained for recognition of the individual dependency region by this amount judging means 23 of operation.

When the fault happens internal to a bus-bar shown in FIG. 2, for example, in area A, the amount Id of operation generated in the area which includes the two areas turns into the amount (differential current) IdA of operation generated in two dependency regions internal to the bus-bar in the dependency region which generated the fault, and it is in the same quantity.

Therefore, the amount operation judging means 23 compares each of the two amounts IdA or IdB computed for every dependency region by each to the amount Id and computed with an operation means for protection 22.

$$|IdA| \geq K1*|Id| \quad (25)$$

When equation (25) is satisfied, it judges with the fault having happened in area A. In addition, K1 of the above-mentioned equation (25) is a coefficient less than or equal to 1.

However, in the case of the fault accompanied by CT saturation, by the judgment by the above-mentioned equation (25), there is a possibility of inviting incorrect operation of the equipment, because of the of error current generated according to the saturation.

Then, with the amount operation judging means 23, by performing instant judging by the amount of change$\Delta$Id of the operating quantity Id, it is considered as a CT saturation cure and an absolute value $|\Delta IdA|$ of the amount of change$\Delta$IdA to the operating quantity and $|\Delta IdB|$ are computed for every individual dependency region about a predetermined term, for example, a term of $\frac{1}{12}$ cycle (about 30 degrees).

The quantity which applies the predetermined coefficient K1 (K1 is a coefficient less than or equal to 1.) to absolute value $|\Delta Id|$ of the amount of change$\Delta$Id to the operating quantity of the predetermined term computed in absolute value $|\Delta IdA|$ of the amount of change$\Delta$IdA of this computed predetermined term, $|\Delta IdB|$, and an operation means for protection 22 is measured.

When the following equation is satisfied, it judges that the fault happened in area A.

$$|\Delta IdA| \geq K1*|\Delta Id| \quad (26)$$

Figure 9:
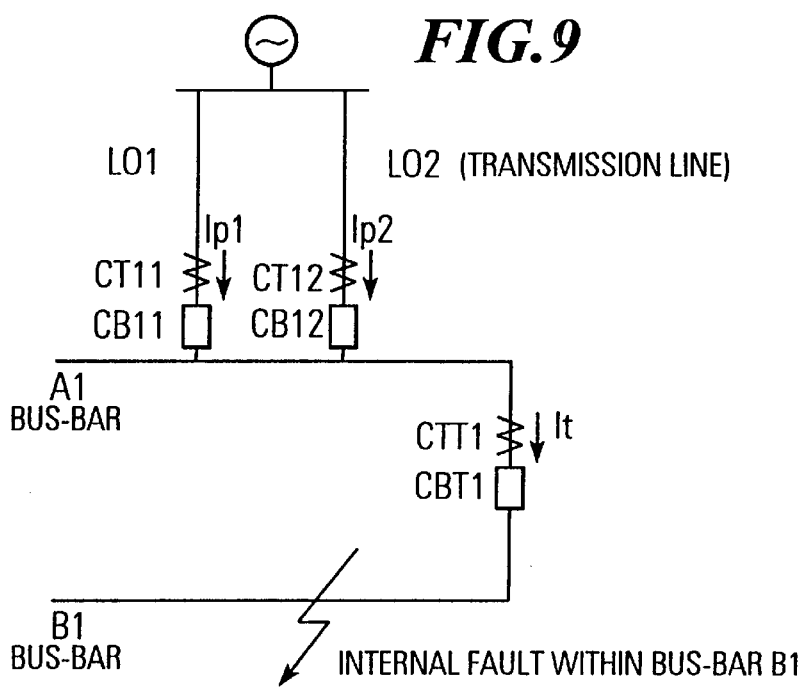
FIG. 9 is a system diagram of the bus-bar system of standard double bus-bar composition.
Figure 10:
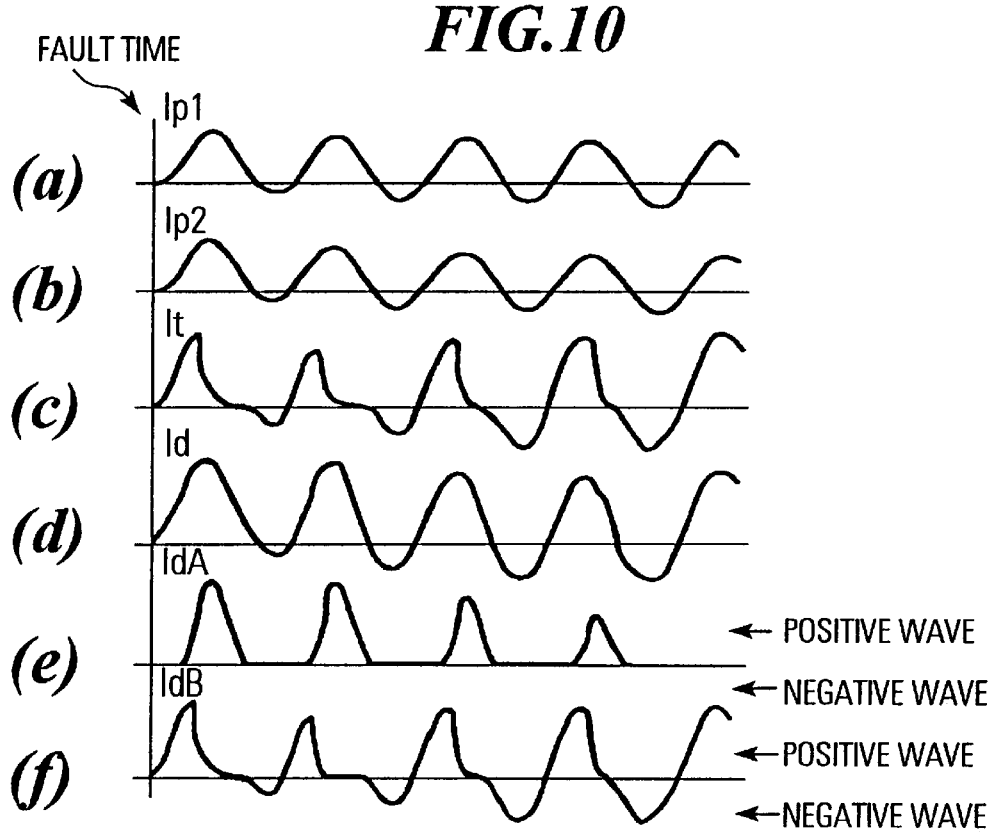
FIG. 10 is a graph showing the operating quantity computed for CT secondary current when the fault happens in the bus-bar B1 shown in FIG. 9, and all bus-bars.

FIGS. 9 and 10 are figures explaining the effect of the judgment by the above-mentioned equation (26).

FIG. 9 is a system diagram of a standard double bus-bar, and which includes a bus-bar A1, a bus-bar B1, and a circuit-breaker CBT1 that separates the bus-bars A1 and B1.

Transmission lines LO1 and LO2 are connected to this bus-bar A1 through the circuit-breakers CB11 and CB12. CTT1, CT11, and CT12 are current transformers.

On the one hand, FIGS. 10(*a*) to FIGS. 10(*f*) are diagrams explaining the amount (current vector sum) of operation computed for CT secondary current at the time of bus-bar B1 fault, and every bus-bar. FIG. 10(*a*) shows secondary current Ip1 of CT11 of FIG. 9. FIG. 10(*b*) shows secondary current Ip2 of CT12 of FIG. 9. FIG. 10 (*c*) shows secondary current It of CTT1 of FIG. 9.

The amount IdA of operation in the area of a bus-bar A1 and FIG. 10(*f*) express the amount IdB of operation in the area of a bus-bar B1, respectively, and the amount Id of operation in the area in which FIG. 10(*d*) includes both the bus-bars A1 and B1, and FIG. 10(*e*) assume the case where a current transformer CTT1 results in CT saturation.

In connection with the saturation of this current transformer CTT1, the amount IdA of operation of the bus-bar A1 that should not generate the operating quantity that is a healthy bus-bar increases after saturation start, and the amount IdB of operation of the bus-bar B1 that is a fault bus-bar decreases.

Therefore, incorrect operation may be operated in the judgment by the absolute amplitude value which is shown in the above-mentioned (25) formula and which needs the operation aperture length of about ½ cycles, for example.

In the judgment using the amount of change like the above-mentioned (26) formula, if it calculates in a term until CT become saturated after fault generating, the comparison can be judged by the normal operating quantity before saturation can be performed.

Therefore, the judgment result not influenced by CT saturation can be outputted.

On the one hand, in a fault detection means 24, the absolute value of change part $\Delta I$ of predetermined time in analog current or the transformed digital data from all the current transformers connected to the bus-bar is added.

The absolute value of change part $\Delta I$ is achieved by calculating a differential electrical quantity between present time and fixed time.

The total of these change part absolute values is compared with the predetermined sensitivity value IK1, and when the total of a change part absolute values is one or more, sensitivity value IK of the following equational expression is predetermined, if the fault has happened for the system, it is detected.

$$\Sigma|\Delta I| \geq IK1 \quad (27)$$

Here, IK1 is defined as a value to detect a minimum fault current.

Judgment operation processing and fault detection processing are performed as mentioned above with the amount operation judging means 23, and a fault detection means 24, and the result is sent out to a fault bus-bar judging means 25.

The fault bus-bar judging means 25 confirms the judgment result outputted from the amount operation judging means 23, when a fault detected signal is received from a fault detection means 24.

For example, the area where conditions, such as the above-mentioned equation (25) and (26), are satisfied is judged to be a fault bus-bar, an abortive area is judged to be a healthy bus-bar, and a predetermined time judging output is retained.

Consequently, with a tripping bus-bar judging means 27, the tripping output is sent out to a fault generating area based on the internal and the external fault judging output of the check zone protection means 22, and the fault bus-bar judging output of a fault bus-bar judging means 25.

For example, when the check zone protection means 22 outputs an internal fault judging and a fault bus-bar judging means 25 outputs the fault judging of area A, the judgment data for tripping bus-bars of the table for a tripping bus-bar judging 26 shown in FIG. 11 are referred to.

The fault judging to the line connected to the bus-bar BA of area A is performed, and tripping output is sent out.

Therefore, according to the above embodiment, amount $\Delta$Id of change in the predetermined time of the operating quantity obtained from the digital data which is the sampling data with which the amount operation judging means 23 is obtained from the dependency region by each, by amount $\Delta$IdA of change and the check zone protection means 22 in the predetermined time of the operating quantity is used.

For example, $$|\Delta IdA| \geq K1*|\Delta Id|$$

(K1 is a coefficient equal to one or less.)

IdA—since the dependency region where the operating quantity was obtained is judged to be a fault generating area, while resulting in CT saturation after fault generating also in the fault accompanied by CT saturation, a judgment result can be outputted correctly in between With a fault bus-bar judging means 25, since it extends the predetermined time combining the output of the amount operation judging means 23, and the output of a fault detection means 24 and the judgment output of a fault bus-bar is sent out, CT saturation cure is obtained in operation.

The fault bus-bar judging is completed in the predetermined time means the time until it outputs a tripping signal to a fault generating area. Even if it is a fault accompanied by CT saturation, without forming like before two or more relays for the division protection with CT saturation measure, a fault generating area is judged, and a tripping signal can be outputted.

Next, the 6th embodiment of the bus-bar protection relay equipment in connection with this invention is explained. As for the form of this embodiment, the amount judging means of operation 23A differs from that show in FIG. 8, and the other structure follows the explanation of structure shown in FIG. 8.

Hereafter, judgment processing of amount judging means of operation 23A which is the portion which mainly differs is explained. This protection relay equipment sets two dependency regions as a protection object.

As the amount judging means of operation 23A, the amount of change (ΔIdA, ΔIdB in the predetermined time of the operating quantity(IdA,IdB) is individually computed to two dependency regions, respectively. When it is more than the value which applied the predetermined coefficient to the amount of change ΔId in the predetermined time of the operating quantity which calculated by the operation means for protection 22, and is obtained and one amount of change is larger than the amount of change of another side among the amount of change of the two these-computed amounts of operation, it judges the area to which the large amount of change Δ is obtained with the fault having happened, and outputs to it.

That is, the amount judging means of operation 23A compares absolute value |ΔIdA| of one amount of change ΔIDA and an absolute value |ΔIdB| of the amount of change ΔIdB of another side other than the condition formation based on the above-mentioned (26) formula.

$$|\Delta IdA| \geq |\Delta IdB| \tag{28}$$

When equation (28) is satisfied, area A from which the amount of change Δ of the operating quantity which becomes ΔIdA is obtained is judged as a fault generating area.

In addition, the amount judging means of operation 23A can also judge a fault area only using the condition judging equation (28).

Next, the 7th embodiment of the bus-bar protection relay equipment in connection with this invention is explained.

In this embodiment, only amount judging means of operation 23B differs from that shown in FIG. 8.

Hereafter, judgment processing of amount judging means of operation 23B which is the portion which mainly differs is explained. This bus-bar protection relay equipment sets two dependency regions as a protection object, and performs phase comparison with the amounts IdA and IdB individually computed as the amount judging means of operation 23B to the amount Id and each dependency region which was computed with the check zone protection means 22.

When both phase difference are smaller than predetermined phase angle, and, when an amount of change of the operating quantity (for example, ΔIdA in area A) in a predetermined time is larger than the predetermined sensitivity value IK2 (sensitivity value which defined IK2 beforehand), for example, $$|\text{phase-difference between Id and IdA}| \leq \theta \tag{29}$$

$$|\Delta IdA| \geq IK2 \tag{30}$$

(θ is predetermined phase angle, which is based on margin related to error "quantity of power system by inputted, calculation". IK2 is a predetermined coefficient to detect variable current by internal fault in bus-bar with margin, for example: an error of electrical quantity inputted or calculation.)

When the above two above equations are satisfied, it judges with fault generating in the dependency region where IdA and the operating quantity which becomes ΔIdA are obtained.

Although FIG. 10 is the operating quantity at the time of the fault, the amount Id of the area which includes the amount IdB of the bus-bar B1, and A1 and one B bus-bar which is a fault generating area serves as the same wave in a term until CT become saturated after fault generating.

During term until CT saturation generates, the phase difference of the amount (vector) of operation of a fault generating area and the amount (vector) of operation of the check zone protection means 22 will not be generated.

Therefore, it judges that the phase difference with the operating quantity individually computed for every dependency region with the operating quantity computed with of the check zone protection means 22 immediately after fault generating is smaller than predetermined phase angle by the condition judging equation of the above-mentioned equation (29). By this judgment, a fault bus-bar can be correctly judged also in the fault accompanied by CT saturation.

On the one hand, the above-mentioned equation (30) may perform a phase comparison judging for confirming the changed level of the required operating quantity.

Furthermore, the eighth of embodiment of the bus-bar protection relay equipment in connection with this invention is explained. Also, in this embodiment, other than judging means 23C that yields, the other components are similar to that shown identically to explanation of FIG. 8 and described earlier.

The judgment processing of amount judging means 23C is now explained. Also, in this bus-bar protection relay equipment, two dependency regions are set as a protection object.

Phase comparison with the amounts IdA and IdB individually computed as the amount judging means of 23C to the amount Id and each dependency region which were computed with an operation means for protection 22 is performed.

The absolute value of the phase difference IdA and IdB is smaller than a predetermined phase angle, for example, 30 degrees. When the amount of change in the predetermined time of the operating quantity individually computed to each dependency region is larger than the quantity which applied the predetermined coefficient to the amount of changeΔId in the predetermined time of the operating quantity computed with an check zone protection means 12.

For example, when both the above-mentioned equations (26) and (29) are satisfied, it can judge with the fault having happened in the dependency region where IdA and the operating quantity which becomes ΔIdA were obtained. Also in this equipment, before reaching the CT saturation theta [predetermined in the phase difference of amounts IdA and IdB of operation degree/of phase angle], for example, when smaller than about 30 degrees, it judges from the relational expressions of equations (26) and (29).

Therefore, also in the fault accompanied by CT saturation, a fault bus-bar can be judged correctly.

Figure 12:
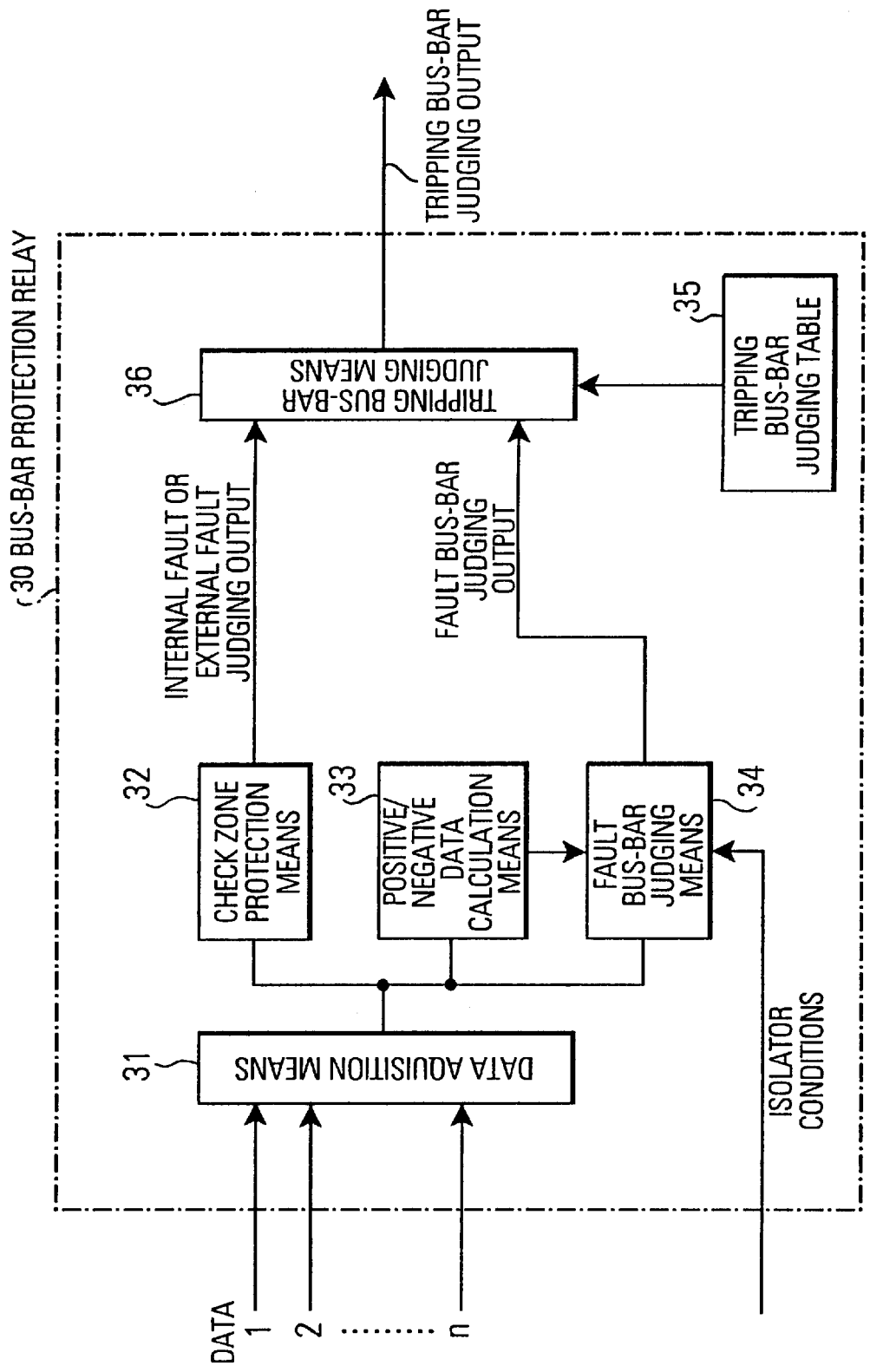
FIG. 12 is a functional block diagram of a 9th embodiment of bus-bar protection relay equipment in connection with this invention.

FIG. 12 is a functional block diagram showing the ninth embodiment of bus-bar protection relay equipment in connection with this invention. This bus-bar protection relay equipment 30 consists of a data-acquisition means 31, a check zone protection means 32, a positive/negative data calculation means 33, a fault bus-bar judging means 34, a tripping bus-bar judging table 35, and a tripping bus-bar judging means 36.

A positive/negative data calculation means 33 divides the operating quantity of the area which includes two or more dependency regions into positive and negative, and computes it.

A fault bus-bar judging means 34 measures individually the positive operating quantity, and the negative operating quantity to two or more dependency regions, respectively.

A fault bus-bar judging means 34 judges the dependency region which the fault has generated, by comparing the operating quantity of the check zone protection means 32 with the positive operating quantity, and the negative operating quantity to two or more dependency regions.

A tripping bus-bar judging table 35 stores the data for a tripping bus-bar judging shown in FIG. 11.

In addition, detailed explanation is omitted here of the structure since the data-acquisition means 21 shown in FIG. 8, the check zone protection means 22, and the tripping bus-bar judging means 27 are same as the data-acquisition means 31, the check zone protection means 32 and the tripping bus-bar judging means 36.

Operation of the bus-bar protection relay equipment is explained.

The data-acquisition means 31 incorporates the analog current signal from the current transformer connected to the bus-bar which has two or more dependency regions for every predetermined cycle, and transforms and outputs it to digital data.

With the check zone protection means 32, the operating quantity and the amount of inhibition are computed using the digital data from the data-acquisition means 31, and the internal and the external fault of the area, which included two or more dependency regions by a predetermined percentage differential protection calculation, are judged and outputted.

On the one hand, with the positive/negative data calculation means 33, the digital data transformed by the data-acquisition means 31 is decomposed into a right wave and negative wave.

A predetermined operation, for example, the sampling data of 1 cycle (for 360 degrees), is added at the operating quantity of the dependency region which includes two or more dependency regions.

From the added value, it divides into a positive amount of operation $|Idp|$, and a negative amount of operation $|Idn|$, computes, and sends out to a fault bus-bar judging means 34.

In about the digital data outputted from the above-mentioned data-acquisition means 31, for example, a fault bus-bar judging means 34 is conventionally well-known, the isolator conditions of each line are incorporated and it discriminates an individual dependency region.

At the same time, it computes positive operating quantities and negative operating quantities for the individual protection areas, for example positive operating quantities $|IdAp|$, $|IdBp|$ and negative operating quantities $|IdAn|$, $|IdBp|$ for the two areas A and B. It then compares these computed operating quantities with values that are the operating quantities $|Idp|$ and $|Idn|$ computed by the positive/negative data calculation means 33 multiplied by a predetermined coefficient, positive with positive and negative with negative.

When the absolute values of both positive and negative operating quantities individually computed for each protection area are the larger, for example when both the relationships provided below are satisfied.

$$|IdAp| \geq K2*|Idp| \quad (31)$$

$$|IdAn| \geq K2*|Idn| \quad (32)$$

(K2 is a constant which is equal to one or less.)

When the above equations are satisfied, a fault which happened in the dependency region where the operating quantity was obtained is detected.

$$|IdBp| \geq K2*|Idp| \quad (33)$$

$$|IdBn| \geq K2*|Idn| \quad (34)$$

(K2 is a constant equal to one or less.)

When the above equations are satisfied, a fault which happened in the dependency region where $|IdBp|$ and the operating quantity $|IdBn|$ was obtained is detected.

Then, the effect of a judgment is explained about this protection relay equipment 30 from the operating quantity at the time of the fault shown in FIG. 10.

Generally, both a right wave and a negative wave exist in the operating quantity of bus-bar B which is a fault generating bus-bar (refer to FIG. 10(*f*)). On the other hand, only a right wave exists in the amount IdA of operation of bus-bar A which is a healthy bus-bar (refer to FIG. 10(*e*)).

The amount, which generates this in connection with CT saturation, of the operating quantity error (error current generated in a healthy bus-bar side) is for generating only in one of a right wave or negative wave.

This phenomenon is for CT saturation phenomenon mainly occur according to the bias of the magnetic flux in direct current of the current.

Therefore, the dependency region which the fault generated correctly from the operating quantity at an above-mentioned equation (31)–(34) to the time of the fault can be selected.

Therefore, according to the form of the above embodiment, a fault bus-bar can be correctly judged also in the fault accompanied by CT saturation by measuring the absolute value of the positive operating quantity individually computed to two or more dependency regions and the absolute value of the negative operating quantity, and the positive operating quantity and the positive negative operating quantity of an area that includes two or more dependency regions, by right and negative.

Furthermore, the 9th embodiment of the bus-bar protection relay equipment in connection with this invention is explained.

Also in this embodiment, since it has the structure shown in FIG. 12, explanation of some component is similar to the explanation provided for FIG. 8 mentioned above, and the fault bus-bar judging means 34, which is the different component is explained below.

This fault bus-bar judging means 34 is added to the judgment conditions of equations (31) and (32).

An absolute value $|IdAp|$ of the operating quantity of the right wave individually computed to each dependency region and absolute value $|IdA|$ of the negative operating quantity are larger than the predetermined sensitivity value defined beforehand, That is, $$|IdAp| \geq IK3 \quad (35)$$

$$|IdAn| \geq IK3 + tm \quad (36)$$

(IK3 is a sensitivity value defined beforehand)

With both equations are satisfied, it detects that the fault happened in the area from which IdAp and the operating quantity which becomes IdAn were obtained.

The purpose of equation (35) and (36) is to confirm the level of the required operating quantity to perform the comparison judging by the absolute value of the computed operating quantity.

Figure 13:
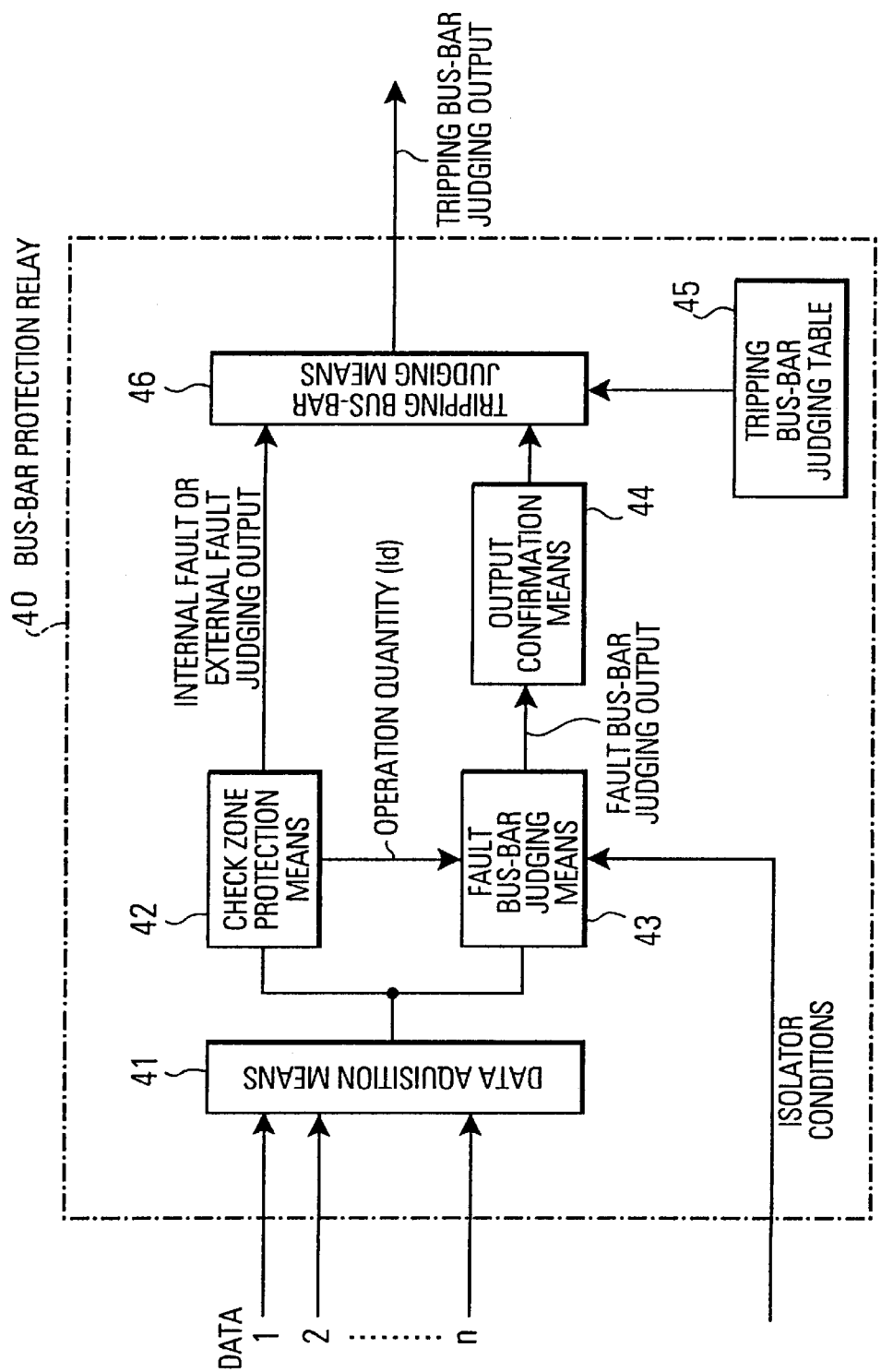
FIG. 13 is a functional block diagram a 10th embodiment of the bus-bar protection relay equipment in connection with this invention.

FIG. 13 is a functional-block diagram showing the 10th embodiment of the bus-bar protection relay equipment in connection with this invention. This bus-bar protection relay equipment 40 includes a data-acquisition means 41, a check zone protection means 42, a fault bus-bar judging means 43, an output confirmation means 44, and a tripping bus-bar judging table 45.

A fault bus-bar judging means 43 measures the operating quantity which computes the operating quantity individually of two or more dependency regions, and computes with this operating quantity, and the check zone protection means 42, judges the dependency region where the fault has generated, and sends out a fault bus-bar judging output.

An output confirmation means 44 confirms whether the same judgment result is continuing during a predetermined time for every dependency region to the output of this fault bus-bar judging means 43.

The tripping bus-bar judging table 45 stores the tripping bus-bar judging data shown in FIG. 11.

Since it has the same structure as shown in FIG. 8 for judging a tripping bus-bar with reference to the tripping bus-bar judging data of the tripping bus-bar judging table 45 based on the internal external fault judging output of the check zone protection means 42, and the judgment result of the output confirmation means 44 and the data-acquisition means 41 and the check zone protection means 42 are the same, explanation of the structure is omitted here.

Next, operation of above protection relay equipment is explained. The analog current signal from the current transformer connected to the bus-bar in which a data-acquisition means 41 has two or more dependency regions for every predetermined time interval is incorporated.

If it transforms and outputs to digital data, with the check zone protection means 42, the operating quantity and the amount of inhibition will be computed using the digital data from the data-acquisition means 41.

The internal and the external faults of the area which included two or more dependency regions by a predetermined percentage differential protection calculation are judged and outputted.

On the one hand, with a fault bus-bar judging means 43, the amounts IdA and IdB are individually computed to each dependency region like the fault bus-bar judging means 25 shown in FIG. 8.

The amount Id of operation computed with the operating quantity and the check zone protection means 42 which were computed are measured, and a fault generating area is judged by the above-mentioned equation (25).

In addition, as mentioned above in this case, when the fault accompanied by the CT saturation happens, a fault generating area cannot be judged correctly but incorrect operation of equipment may be invited.

Then, in this equipment, the judgment output of the fault bus-bar judging means 43 is sent out to the output confirmation means 44, and a judgment is made possible also by the fault generated in connection with the CT saturation here.

That is, it judges whether the judgment output of the fault bus-bar judging means 43 is continuing the output confirmation means 44 for a predetermined time, for example, 4 cycles, for every dependency region.

Only when continuing, the judgment result of a fault bus-bar judging means 43 is outputted.

The amount of error of the operating quantity accompanied by this CT saturation becomes maximum immediately after generating of the CT saturation, and it decreases after that.

Although the damping time constant related to direct current of fault current which is the cause of generating of this CT saturation changes with the impedance of a system, generally, by the fault in a high resistance installation system, even if it is long, it is about 50 ms, and the most decreases it between 4 cycles (50 Hz system appearance is also 80 ms) after the fault.

Usually, if 4 cycles have passed after the fault, since CT saturation resulting from direct current of fault current will be recovered, the judgment of a fault bus-bar judging means 43 can confirm whether it is correct or not.

After confirming the judgment result with the output confirmation means 44 as mentioned above, a tripping bus-bar judging means 46 is supplied.

The tripping bus-bar judging means 46 sends out a tripping output according to the tripping bus-bar judging table 45 using the internal external fault judging output of the check zone protection means 42, and the output of the confirmation result of the output confirmation means 44.

As an example, a check zone protection means will judge a tripping bus-bar judging means 46, for example, to be an internal fault. On the one hand, when a fault bus-bar judging means 43 judges with the fault of the area A, the tripping output to the line connected to the bus-bar of the area A is sent out.

Therefore, according to the above embodiment, the output confirmation means 44 is formed in the output side of a fault bus-bar judging means 43, and while the judgment output of a fault bus-bar judging means 43 is carrying out time continuation for a predetermined time, the concerned judgment output is sent out.

Therefore, a part for the error of the operating quantity accompanied by the CT saturation is not only avoidable, but it can judge the generating area of the fault correctly in the time of the fault accompanied by the CT saturation.

In addition, also in the form of each embodiments, it can carry out the application of the operation principles of FIGS. 4 to 7.

Furthermore, in the above mentioned each embodiment, the effect can be confirmed by filtering the fault bus-bar judging output through the confirmation means 44 before the fault bus-bar judging output is input into the tripping bus-bar judging means.

In the explanation in the above-mentioned embodiments, although the bus-bar system was used as into the example, it is not limited to this.

The same effect can be obtained if it is the system which has the structure which includes two or more dependency regions where the protection by the principal of the differential calculation is applied.

When using the present invention as described above, the design is to judge the fault occurrence area, even when a fault is accompanied by the CT saturation, using the operating quantity obtained from sampling data corresponding to a region that contains multiple protection areas and operating quantities obtained from sampling data corresponding to individual protection areas.

Thus, the discriminating zone protection relays can be reduced. Therefore, cost can be reduced and reliability can be improved with a simplified structure.

The entire contents of JAPANESE PRIORITY APPLICATION NUMBER P10-126678, filed on Apr. 21, 1998, are hereby incorporated by reference.

Obviously, numerous modifications and variations of the present invention are possible in lightening of the above teachings. It is therefore to be understood that within the scope of the appended claims, the invention may be practiced otherwise than as specifically described herein.

What is claimed:

1. A bus-bar protection relay equipment for judging a protective region having a fault, among a protective zone that includes a plurality of protective regions, based on status of a power system, comprising:

a first judging unit configured to judge whether an internal fault or an external fault exists in the protective zone by performing a percentage differential protection calculation based on an operating quantity Id and a restrained quantity Ir of the protective zone;

a first calculating unit configured to calculate an operating quantity Idi of each protective region, where i is equal to an integer from 1 to n;

a second judging unit configured to judge a protective region having the internal fault when an absolute value of a Idi is larger than a coefficient multiplied by an absolute value of a Id; and an output unit configured to output a signal to separate non-fault protective regions from a protective region with the fault based on the result of the first judging unit and the second judging unit.

2. A bus-bar protection relay equipment for judging a protective region having a fault, among a protective zone that includes a plurality of protective regions, based on status of a power system, comprising:

a first judging unit configured to judge whether an internal fault or an external fault exists in the protective zone by performing a percentage differential protection calculation based on an operating quantity Id and a restrained quantity Ir of the protective zone;

a first calculating unit configured to calculate an operating quantity Idi of each protective region, where i is equal to an integer from 1 to n;

a second judging unit configured to judge a protective region having the internal fault when an absolute difference between a value of the Idi and a value of the Id is smaller than a coefficient multiplied by an absolute value of the Id; and an output unit configured to output a signal to separate non-fault protective regions from a protective region with the fault based on the result of the first judging unit and the second judging unit.

3. A bus-bar protection relay equipment according to claim 2, wherein the second judging unit configured to judge the protective region having the internal fault when following equations are satisfied:

(1) an absolute value of the Idi is more than the coefficient multiplied with an absolute value of the Id, (2) a phase difference between a phase of the Idi and a phase of the Id is less than a designated phase of the Idi to satisfy the equation (1); and an output unit configured to output a signal to separate non-fault protective regions from a protective region with the fault based on the result of the first judging unit and the second judging unit.

4. A bus-bar protection relay equipment according to claim 2, wherein the second judging unit configured to judge a protective region having the internal fault when following equations are satisfied:

(1) an absolute value of the Idi is more than a coefficient (less than 1) multiplied with an absolute value of the Id;

(2) an absolute value of the Idi is more than a coefficient (more than 1) multiplied with an absolute value of the Id;

(3) a phase difference between a phase of the Idi and a phase of the Id is less than designated phase of the Idi to satisfy the equations (1) and (2); and an output unit configured to output a signal to separate non-fault protective regions from a protective region with the fault based on the result of the first judging unit and the second judging unit.

5. A bus-bar protection relay equipment according to claim 2, wherein the second judging unit configured to judge a protective region having the internal fault when following equations are satisfied:

an absolute value of the Idi is more than a coefficient (less than 1) multiplied with a value of max {an absolute Id, a prescribed value}; and an output unit configured to output a signal to separate non-fault protective regions from a protective region with the fault based on the result of the first judging unit and the second judging unit.

6. A bus-bar protection relay equipment according to claim 2, wherein the second judging unit configured to judge a protective region having the internal fault when following equations are satisfied:

(1) an absolute value of the Idi is more than a coefficient (less than 1) multiplied with a value of max {an absolute Id, a prescribed value};

(2) a phase difference between a phase of the Idi and a phase of Id is less than a designated phase of the Idi to satisfy the equation (1); and an output unit configured to output a signal to separate non-fault protective regions from a protective region with the fault based on the result of the first judging unit and the second judging unit.

7. A bus-bar protection relay equipment according to claim 2, wherein the second judging unit configured to judge a protective region having the internal fault when following equations are satisfied:

(1) an absolute value of the Idi is more than a coefficient (less than 1) multiplied with a value of max{an absolute Id, a prescribed value};

(2) an absolute value of the Idi is less than a coefficient multiplied (more than 1) an absolute value of the Id;

(3) a phase difference between a phase of the Idi and a phase of the Id is less than designated phase of the Idi to satisfy the equation (1) and (2); and an output unit configured to output a signal to separate non-fault protective regions from a protective region with the fault based on the result of the first judging unit and the second judging unit.

8. A bus-bar protection relay equipment according to claim 2, wherein the second judging unit configured to judge a protective region having the internal fault when following equations are satisfied:

(1) an absolute value of the Idi is more than a value which a coefficient (less than 1) multiplied with a sum of an absolute value of the Id and a prescribed value;

(2) an absolute value of the Idi is less than a value which a coefficient (more than 1) multiplied with the sum of an absolute value of the Id and a prescribed value;

(3) a phase difference between a phase of the Idi and phase of the Id is less than a designated phase among the Idi to satisfy the equations (1) and (2); and an output unit configured to output a signal to separate non-fault protective regions from a protective region with the fault based on the result of the first judging unit and the second judging unit.

9. A bus-bar protection relay equipment according to claim 2, wherein the second judging unit configured to judge a protective region having the internal fault when a difference between an absolute value of the Idi and an absolute value of the Id is less than a coefficient multiplied with an absolute value of the Id and that an absolute value of the Idi is more than a coefficient (less than 1) multiplied with a prescribed value; and an output unit configured to output a signal to separate non-fault protective regions from a protective region with the fault based on the result of the first judging unit and the second judging unit.

10. A bus-bar protection relay equipment according to claim 2, wherein the second judging unit configured to judge a protective region having the internal fault when following equations are satisfied:

(1) an absolute value of the Idi is more than a coefficient (less than 1) multiplied with a prescribed value;
(2) an absolute value difference between the Idi and the Id is less than a coefficient multiplied with an absolute value of the Id; and an output unit configured to output a signal to separate non-fault protective regions from a protective region with the fault based on the result of the first judging unit and the second judging unit.

11. A bus-bar protection relay equipment for judging a protective region having a fault, among a protective zone that includes two protective regions, based on status of power system, comprising:

a first judging unit configured to judge whether an internal fault or an external fault exists in the protective zone by performing a percentage differential protection calculation based on operating quantity and a restrained quantity of the protective zone;

a first calculating unit configured to calculate each operating quantity the Idi of two protective regions;

a second judging unit configured to judge a protective region having an internal fault when an absolute value of one protective region is larger than a coefficient multiplied with an absolute value of Id and that an absolute value of the other protective region is smaller than a coefficient multiplied with an absolute value of the Id; and an output unit configured to output a signal to separate non-fault protective regions from a protective region with the fault based on the result of the first judging unit and the second judging unit.

12. A bus-bar protection relay equipment for judging a protective region having a fault, among a protective zone that includes a plurality of protective regions, based on status of a power system, comprising:

a first judging unit configured to judge whether an internal fault or an external fault exists in the protective zone by performing a percentage differential protection calculation based on an operating quantity Id and a restrained quantity Ir of the protective zone;

a first calculating unit configured to calculate each operating quantity Idi, where i is equal to an integer from 1 to 2 for two protective regions;

a second calculating unit configured to calculate each amount of change ($\Delta$Idi, $\Delta$Id) of the Idi and the Id, respectively, in a predetermined time; and a second judging unit configured to judge a protective region having an internal fault when following equations are satisfied:

(1) an absolute value of the $\Delta$Idi is more than a coefficient multiplied with an absolute value of the $\Delta$Id;
(2) an absolute value of max {an absolute value of the $\Delta$Idi} is more than a coefficient multiplied with an absolute value of the $\Delta$Id.

13. A bus-bar protection relay equipment for judging a protective region having a fault, among a protective zone that includes two protective regions, based on status of a power system, comprising:

a first judging unit configured to judge whether an internal fault or an external fault exists in the protective zone by performing a percentage differential protection calculation based on an operating quantity Id and a restrained quantity Ir of the protective zone;

a first calculating unit configured to calculate each operating quantity Idi, where i is an integer from 1 to 2 of two protective regions;

a second calculating unit configured to calculate each mount of change $\Delta$Idi, $\Delta$Id for the Idi and the Id, respectively, in a predetermined time; and a second judging unit configured to judge a protective region having an internal fault when an absolute value of the $\Delta$Idi is more than a coefficient multiplied with an absolute value of the $\Delta$Id.

14. A bus-bar protection relay equipment for judging a protective region having a fault, among a protective zone that includes a plurality of protective regions, based on status of a power system, comprising:

a first judging unit configured to judge whether an internal fault or an external fault exists in the protective zone by performing a percentage differential protection calculation based on an operating quantity Id and a restrained quantity Ir of the protective zone;

a first calculating unit configured to calculate a positive operating quantity Id+ and a negative operating quantity Id− based on an operating quantity Id of a protective zone;

a second calculating unit configured to calculate a positive operating quantity Idi+ and a negative operating quantity Idi− based on an operating quantity Idi of each protective region, where i is equal to an integer from 1 to n;

a second judging unit configured to judge a protective region having an internal fault when following equations are satisfied:

(1) an absolute value of the Idi+ is more than a coefficient multiplied with an absolute value of the Id+;
(2) an absolute value of the Idi− is more than a coefficient multiplied with an absolute value of the Id−; and a sending unit for sending tripping output based on both result of the first judging unit and the second judging unit.

15. A bus-bar protection relay equipment for judging a protective region having a fault, among a protective zone that includes a plurality of protective regions, based on status of a power system, comprising:

a first judging unit configured to judge whether an internal fault or an external fault exists in the protective zone by performing a percentage differential protection calculation based on an operating quantity Id and a restrained quantity Ir of the protective zone;

a first unit configured to calculate amount of change $\Delta Idi$ of the Idi in a predetermined time;

a second unit configured to calculate amount of change $\Delta Id$ of Id in the predetermined time;

a third unit configured to judge a protective region with fault when an absolute value of the $\Delta Idi$ is more than a coefficient multiplied with an absolute value of the $\Delta Id$.

16. A bus-bar protection relay equipment according to claim 15, wherein the third unit configured to judge a protective region with a fault when followings equations are satisfied:

(1) an absolute value of the $\Delta Idi$ is more than a coefficient multiplied with an absolute value of the $\Delta Id$; and (2) an absolute value of max {the $\Delta Idi$} is more than the coefficient multiplied with the absolute value of the $\Delta Id$.

17. A bus-bar protection relay equipment for judging a protective region having a fault, among a protective zone that includes a plurality of protective regions, based on status of a power system, comprising:

a first judging unit configured to judge whether an internal fault or an external fault exists in the protective zone by performing a percentage differential protection calculation based on an operating quantity Id and a restrained quantity Ir of the protective zone;

a first calculating unit configured to calculate an operating quantity Idi of each protective region, where i is equal to an integer from 1 to n;

a second judging unit configured to judge a protective region having an internal fault, based on equation between amount of change of the Idi and amount of change of the Id in a predetermined time;

a fault detecting unit configured to detect a fault in the power system; and a third judging unit configured to send a tripping output in the protective region when a fault is determined by the second judging unit, the fault detecting unit and the first judging unit.

18. A bus-bar protection relay equipment according to claim 17, wherein the first judging unit comprising:

a first unit configured to calculate amount of the $\Delta Idi$ of the Idi in a predetermined time;

a second unit configured to calculate amount of the $\Delta Id$ of the Id in the predetermined time;

a third unit configured to judge a protective region with a fault when an absolute value of the $\Delta Idi$ is more than a coefficient multiplied with an absolute value of the $\Delta Id$.

19. A bus-bar protection relay equipment according to claim 17, wherein the first judging unit comprising:

a first unit configured to calculate amount of a Idi of the Idi in a predetermined time; a second unit configured to calculate amount of a Id of the Id in a predetermined time; and a third unit configured to judge a protective region with a fault when following equations are satisfied:

(1) a phase difference between a phase of the Idi and a phase of the Id is less than a designated phase; and (2) an absolute value of the Idi is more than a predetermined value.

20. A bus-bar protection relay equipment according to claim 17, wherein the first judging unit comprising:

a first unit configured to calculate amount of the Idi of the Idi in a predetermined time; a second unit configured to calculate amount of the Id of the Id in a predetermined time; a third unit configured to judge a protective region with fault when following equations are satisfied:

(1) a phase difference between a phase of the Idi and a phase of the Id is less than a designated phase; and (2) an absolute value of the Idi is more than an absolute value of the Id.

21. A bus-bar protection relay equipment according to claim 18, wherein the second judging unit comprising:

a first unit configured to judge a protective region having a fault, among a protective zone that includes a plurality of protective regions, based on a status of power system, comprising:

a first judging unit configured to judge whether an internal fault or an external fault exists in a protective zone by performing a percentage differential protection calculation based on an operating quantity Id and a restrained quantity Ir of the protective zone;

a first calculating unit configured to calculate a positive operating quantity Id+ and a negative operating quantity Id− based on an operating quantity Id of a protective zone;

a second calculating unit configured to calculate a positive operating quantity Idi+ and a negative operating quantity Idi− based on an operating quantity Idi of each a protective region, where i is equal an integer from 1 to n; and a second judging unit configured to judge a protective region having an internal fault when following equations are satisfied:

(1) an absolute value of the Idi+ is more than a coefficient multiplied with an absolute value of the Id+;

(2) an absolute value of the Idi− is more than a coefficient multiplied with an absolute value of Id−; and (3) an absolute value both of the Idi+ and the Idi− is more than a predetermined value.

* * * * *